(12) United States Patent
Schipper

(10) Patent No.: US 6,473,557 B2
(45) Date of Patent: Oct. 29, 2002

(54) RECORDING AND REPRODUCTION OF AN INFORMATION SIGNAL IN/FROM A TRACK ON A RECORD CARRIER

(75) Inventor: Alphonsus T. J. M. Schipper, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/972,580

(22) Filed: Oct. 5, 2001

(65) Prior Publication Data

US 2002/0021520 A1 Feb. 21, 2002

Related U.S. Application Data

(63) Continuation of application No. 09/326,509, filed on Jun. 4, 1999.

(30) Foreign Application Priority Data

Jun. 5, 1998 (EP) .............................................. 98201880

(51) Int. Cl.[7] ................................................. H04N 5/91
(52) U.S. Cl. ........................... 386/65; 386/95; 386/111; 348/423.1
(58) Field of Search ................................ 386/125–126, 386/11–112, 98, 45, 46, 65, 95; 348/423.1; 360/27, 51; H04N 5/91

(56) References Cited

U.S. PATENT DOCUMENTS

| 5,845,042 | A | * | 12/1998 | Yanagihara | ................... | 386/81 |
| 5,953,483 | A | | 9/1999 | Van Gestel et al. | ........... | 386/65 |
| 6,011,899 | A | * | 1/2000 | Ohishi et al. | .................. | 386/98 |
| 6,122,123 | A | * | 9/2000 | Saeijs et al. | ................... | 360/51 |
| 6,128,433 | A | * | 10/2000 | Gable et al. | ................... | 386/87 |
| 6,173,114 | B1 | * | 1/2001 | Yanagihara et al. | ......... | 386/109 |
| 6,341,193 | B1 | * | 1/2002 | Schipper | ...................... | 386/65 |

FOREIGN PATENT DOCUMENTS

WO    WO9630905    10/1996    ........... G11B/20/10

* cited by examiner

*Primary Examiner*—Vincent Boccio
(74) *Attorney, Agent, or Firm*—Edward W. Goodman

(57) ABSTRACT

Normally, in an MPEG recorder, during recording, a time stamp counter is locked to the program clock reference of the incoming stream by pulling the clock frequency of a controllable oscillator. During playback, the oscillator is left free running. Playback and recording situations lead to conflicting requirements. By using an adder that adds an increment value to a count value in order to obtain the next count value, these conflicts can be resolved. The time stamp values are derived from the count values. During recording, the value of the increment value is controllable, and during playback, the value of the increment value is fixed.

2 Claims, 3 Drawing Sheets

RECORDING AND REPRODUCTION OF AN INFORMATION SIGNAL IN/FROM A TRACK ON A RECORD CARRIER

CROSS-REFERENCE TO RELATED APPLICATIONS

This is a continuation of U.S. patent application Ser. No. 09/326,509, filed Jun. 4, 1999.

BACKGROUND OF THE INVENTION

1. Field of the Invention

The invention relates to a recording apparatus for recording an information signal in a track on a record carrier, the information signal comprising packets that may occur irregularly as a function of time in the serial datastream of the information signal, the apparatus comprising input means for receiving the information signal, time stamp generator means for generating time stamps having a relationship to the moment of occurrence of a packet comprised in the information signal received, the time stamp generator means being adapted to generate subsequent cycles of count values in response to a clock signal, the time stamp generator means being adapted to derive a time stamp value in response to the detection of occurrence of a packet in said information signal received, a time stamp value for said packet having a relationship to the count value at said moment of occurrence of said packet, combining means for combining a packet and its corresponding time stamp value so as to obtain a composite packet, and writing means for writing the composite packet in said track on the record carrier.

The invention further relates to a reproducing apparatus and to a recording method.

2. Description of the Related Art

A recording apparatus as defined in the opening paragraph is known from International Patent Application WO 96/30905 (PHN 15260), corresponding to U.S. patent application Ser. No. 08/622,508, filed Mar. 26, 1996, now U.S. Pat. No. 5,953,483. The apparatus is adapted to record an MPEG encoded information signal, such as a video signal, on a record carrier, such as a magnetic record carrier.

In prior art systems for recording MPEG Transport Streams, it is necessary to lock a local timestamp counter to the Program Clock Reference of the incoming Transport Stream during recording. The timestamp counter is used to record the arrival time of an incoming Transport Stream packet in order to be able to reconstruct the original packet timing during playback. The timestamp counter must be locked to the Program Clock of the incoming stream to make the recording independent of any frequency offset in the incoming Program Clock Reference signal. In addition, The Program Clock Reference of the incoming stream can be used as a timing reference for processes that need to lock to it (e.g., a drum in D-VHS). During playback, a free running clock is needed with a frequency of 27 MHz and an accuracy of, for instance, +/−20 ppm. From this clock, the packet timing is reconstructed again and processes may be locked to this clock.

SUMMARY OF THE INVENTION

The invention aims at providing an improved recording apparatus. The recording apparatus in accordance with the invention is characterized in that the time stamp generator means comprises:

variable increment value determining means for generating a variable increment value in response to a control signal, adder means for adding the variable increment value to a count value in response to the clock signal so as to obtain a subsequent count value in a cycle of count values, and comparator means for comparing one or more program clock reference values comprised in packets in the information signal with one or more time stamp values so as to derive the control signal therefrom.

The invention is based on the following recognition. Normally, in the prior art recording apparatuses, the timestamp counter runs on a local clock whose frequency is locked to the Program Clock Reference of the incoming stream. Any processes that need to be locked to the Program Clock Reference can derive their timing from the locked clock. The local clock is derived from a Voltage Controlled Crystal Oscillator (VCXO) which is adjusted by a feedback control loop. During playback, the VCXO is left free running (it gets a fixed control voltage) and its frequency should stay as close as possible to 27 MHz.

To do this, two conflicting requirements are present for the VCXO. On the one hand, during recording, it needs to be pullable in order to lock to the incoming Program Clock Reference, while, on the other hand, it needs to be stable and stay as close as possible to 27 MHz during playback.

In accordance with the invention, a solution is presented that enables the locking with a crystal that does not need to be pulled and only has requirements for stability. Instead of locking the frequency of the clock during recording, only the increment speed of one or more counters is adjusted (locked) to the speed of the incoming Program Clock Reference. The state of the locked counter(s) is used as a reference inside the recording system.

BRIEF DESCRIPTION OF THE DRAWINGS

These and other aspects of the invention will be come apparent from the drawings, in which.

DESCRIPTION OF THE PREFERRED EMBODIMENTS

Figure 1:
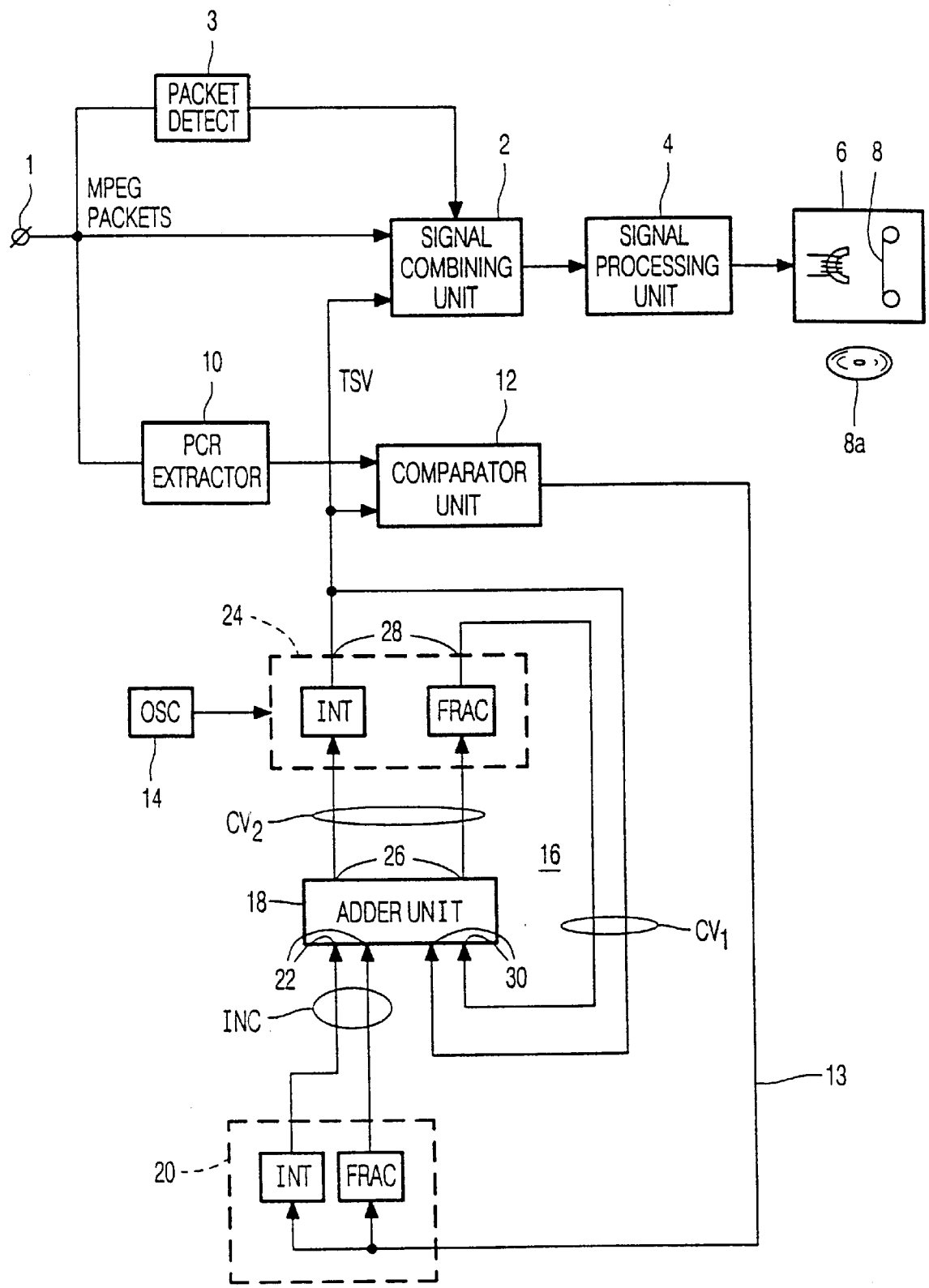
FIG. 1 shows an embodiment of the recording apparatus.

The apparatus of FIG. 1 has an input terminal 1 for receiving a serial datastream of MPEG packets. The input terminal 1 is coupled to a first input of a signal combining unit 2, which has a second input for receiving a time stamp value (TSV) that is included in a packet so as to obtain composite packets at its output. The output of the signal combining unit 2 is coupled, via a signal processing unit 4, in which a channel coding step can be applied to the serial datastream of composite packets, to a write unit 6 for writing the processed serial datastream of converted packets in a track on a record carrier 8, such as a magnetic tape. In another embodiment, the processed serial datastream of composite packets is recorded on a disk-like record carrier 8a, such as an optical disk. A packet detector unit 3 is also provided for detecting the moment of occurrence of a packet and for generating a control signal in response to such detection. In response to the control signal, the signal combining unit 2 stores a time stamp value TSV in the packet detected.

A Program Clock Reference value extraction unit 10 is provided for extracting the well-known PCR values, defined in the MPEG standard, from those packets in the serial datastream received that include a PCR value. An output of the extraction unit 10 is coupled to a first input of a comparator unit 12. A second input of the comparator unit 12 receives the time stamp value TSV. A time stamp value generator unit 16 is provided for generating the time stamp values TSV. The time stamp value generator unit 16 comprises an adder unit 18 and an increment value generator unit 20. The increment value generator unit 20 supplies an increment value, denoted INC, which is supplied to a first input 22 of the adder unit 18. Further, a memory unit 24 is present for storing the output value at the output 26 of the adder unit 18. The output 28 of the memory unit 24 is coupled to a second input 30 of the adder unit 18. An oscillator unit 14 is provided for generating a clock signal with a frequency of 27 MHz and an accuracy of +/−30 ppm. The memory unit 24 stores the output value of the adder unit 18, each time, in response to a clock pulse supplied by the oscillator unit 14.

The increment value INC has an integer portion INT, expressed in a specified number of bits, such as P bits, and a fractional portion FRAC, also expressed in a specified number of bits, such as Q bits. In an example, P=1 and Q=22. The adder unit 18 is adapted to add the P+Q bit increment value INC to an M+Q bit count value $CV_1$ that is supplied to the inputs 22 and 30, respectively, and supplies the result, as the subsequent count value $CV_2$ to its output 26. M equals 23, in the present example. Upon a clock signal, supplied by the oscillator unit 14, the count value $CV_2$ is stored in the memory unit 24 and becomes therewith the count value $CV_1$. The time stamp value TSV equals the integer portion INT of the count value $CV_1$, and only the M bits of the integer portion of $CV_1$ are supplied to the comparator unit 12 for comparison with the PCR value, more specifically, with the M least significant bits of the PCR value, as well as to the signal combining unit 2, for inclusion in a packet.

$CV_1$ thus increments with each tick of the 27 MHz oscillator 14. However, the increment is not an integer equal to one, but a fractional number close to 1.0 (for instance, 1.0 +/−100 ppm). The increment INC is adjustable within the +/−100 ppm range (for instance in 256 or 512 steps). Just as with the conventional approach, each time a PCR comes into the system, it is compared against the TSV and, if necessary, the increment INC of the count values is adjusted (instead of adjusting the frequency of the oscillator, as in the prior art). Comparison results are low-pass filtered in the comparator unit 12 to suppress the influence of PCR jitter in the incoming stream. In this way, the TSV can be locked to the incoming Program Clock.

Figure 2:
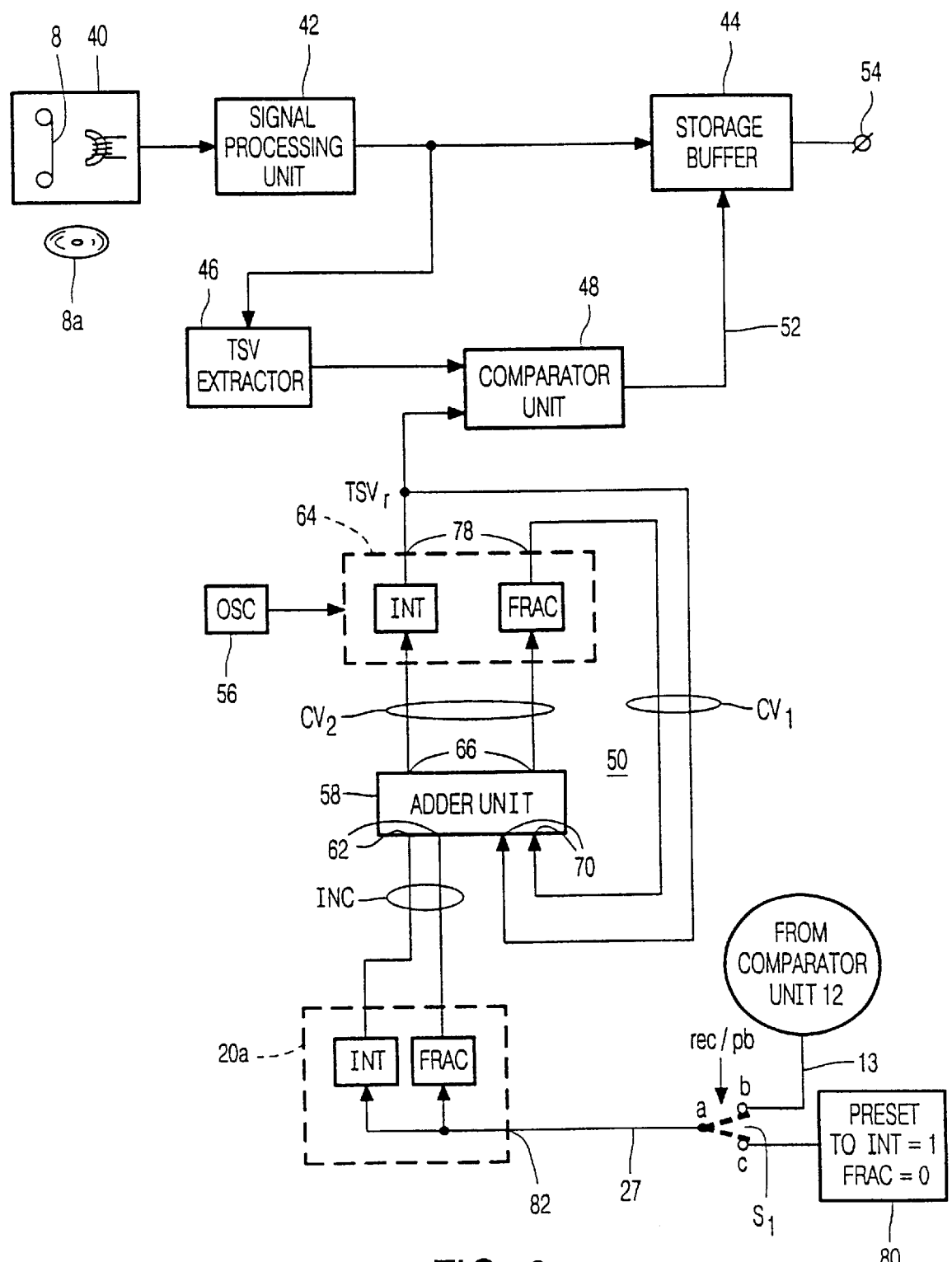
FIG. 2 shows an embodiment of a reproduction apparatus.

FIG. 2 shows an apparatus for reproducing the composite MPEG packets recorded on the record carrier 8 or 8a by the apparatus of FIG. 1. The apparatus comprises a read unit 40 for reading the composite packets from the record carrier. An output of the read unit 40 is coupled to an input of a signal processing unit 42, which realizes a signal processing step on the signal read from the record carrier inverse to the signal processing carried out by the signal processing unit 4 of the recording apparatus. A series of composite packets appear at the output of the signal processing unit 42, this output being coupled to inputs of a buffer unit 44 and an extractor unit 46. The extractor unit 46 extracts the time stamp values TSV from the composite packets and supplies the time stamp values to a first input of a comparator unit 48. The packets, which may have the time stamp values retrieved therefrom, are stored in the buffer unit 44. A reference time stamp generator unit god 50 is provided for generating reference time stamp values $TSV_r$. These reference time stamp values are supplied to a second input of the comparator unit 48 for comparison with the time stamp values retrieved from the composite packets. Upon coincidence between a reference time stamp value and a time stamp value retrieved from a packet, a control signal is generated by the comparator unit 48 on the line 52, and the packet, from which the time stamp value was retrieved, is presented at the output 54 of the buffer unit 44 in response to the control signal, such as, for further processing.

The reference time stamp generator unit 50 comprises an oscillator unit 56 that generates a clock signal with a constant frequency of 27 MHz. The reference time stamp generator unit 50 further comprises an adder unit 58 and an increment value generator unit 20a. The increment value generator unit 20a supplies an increment value, denoted INC, which is supplied to a first input 62 of the adder unit 58. Further, a memory unit 64 is provided for storing the output value at the output 66 of the adder unit 58. The output 78 of the memory unit 64 is coupled to a second input 70 of the adder unit 58. The oscillator unit 56 has an accuracy of +/−30 ppm. The memory unit 64 stores the output value of the adder unit 58, each time, in response to a clock pulse supplied by the oscillator unit 56.

The increment value INC has an integer portion INT, expressed in a specified number of bits, such as P bits, and a fractional portion FRAC, also expressed in a specified number of bits, such as Q bits. In the above given example, P=1 and Q=22. The adder unit 58 is adapted to add the P+Q bit increment value INC Ad to an M+Q bit count value $CV_1$ that is supplied to the inputs 62 and 70, respectively, and supplies the result, as the subsequent count value $CV_2$ to its output 66. Upon a clock signal, supplied by the oscillator unit 56, the count value $CV_2$ is stored in the memory unit 64 and becomes therewith the count value $CV_1$. The reference time stamp value $TSV_r$ equals the integer portion INT of the count value $CV_1$, and only the M bits of the integer portion of $CV_1$ are supplied to the comparator unit 48 for comparison with the M-bit TSV value. M is again equal to 23.

$CV_1$ thus increments with each tick of the 27 MHz oscillator 56. The increment is a constant, preferably, an integer equal to one. Just as with the conventional approach, each time a TSV value is retrieved from a packet, it is compared against the reference value $TSV_r$ and if equality occurs, the packet in question is supplied to the output 54.

The increment value in the apparatus of FIG. 2 is thus fixed and relates to the actual frequency of the oscillator 56. When the oscillator frequency is exactly 27 MHz, the increment value will be exactly 1. The apparatus may, however, account for a deviation of the actual frequency of the oscillator 56 from the required value of 27 MHz, by setting the increment value to a slightly higher value than 1, in the situation where the frequency of the oscillator 56 is lower than 27 MHz, or by setting the increment value to a slightly lower value than 1, when it turns out that the frequency of the oscillator 56 is higher than 27 MHz.

In an embodiment of the apparatus in accordance with the invention, which is capable of both recording and reproducing, the increment value generator unit 20a in the apparatus of FIG. 2 can, in addition, be provided with a control signal input 82, and the apparatus may then further be provided with a switch S1 and a preset control signal generating unit 80.

A control signal is generated on the line 27 to set the increment value INC to a fixed value, such as the value 1.

This control signal can be obtained from the preset control signal generating unit 80 which generates the control signal to preset the increment value generator unit 20a so that it generates the constant increment value INC, such as the value 1. The switch $S_1$ could be included between the preset control signal generating unit 80 and the increment value generator unit 20a. The switch $S_1$ has a terminal "a" coupled to the control signal input 82 of the increment value generator unit 20a, a terminal "c" coupled to the output of the preset control signal generating unit 80 and a terminal "b" coupled to the output of the comparator unit 12 of FIG. 1. In response to a rec/pb control signal, the switch $S_1$ is set to its position a–b, when the apparatus is switched into the recording mode, and is set to its position a–c when the apparatus is switched into its reproduction mode. In the reproduction mode, the increment value INC is constant, preferably equal to 1, and in the recording mode, the increment value is controllable by means of the control signal generated by the comparator unit 12.

Figure 3:
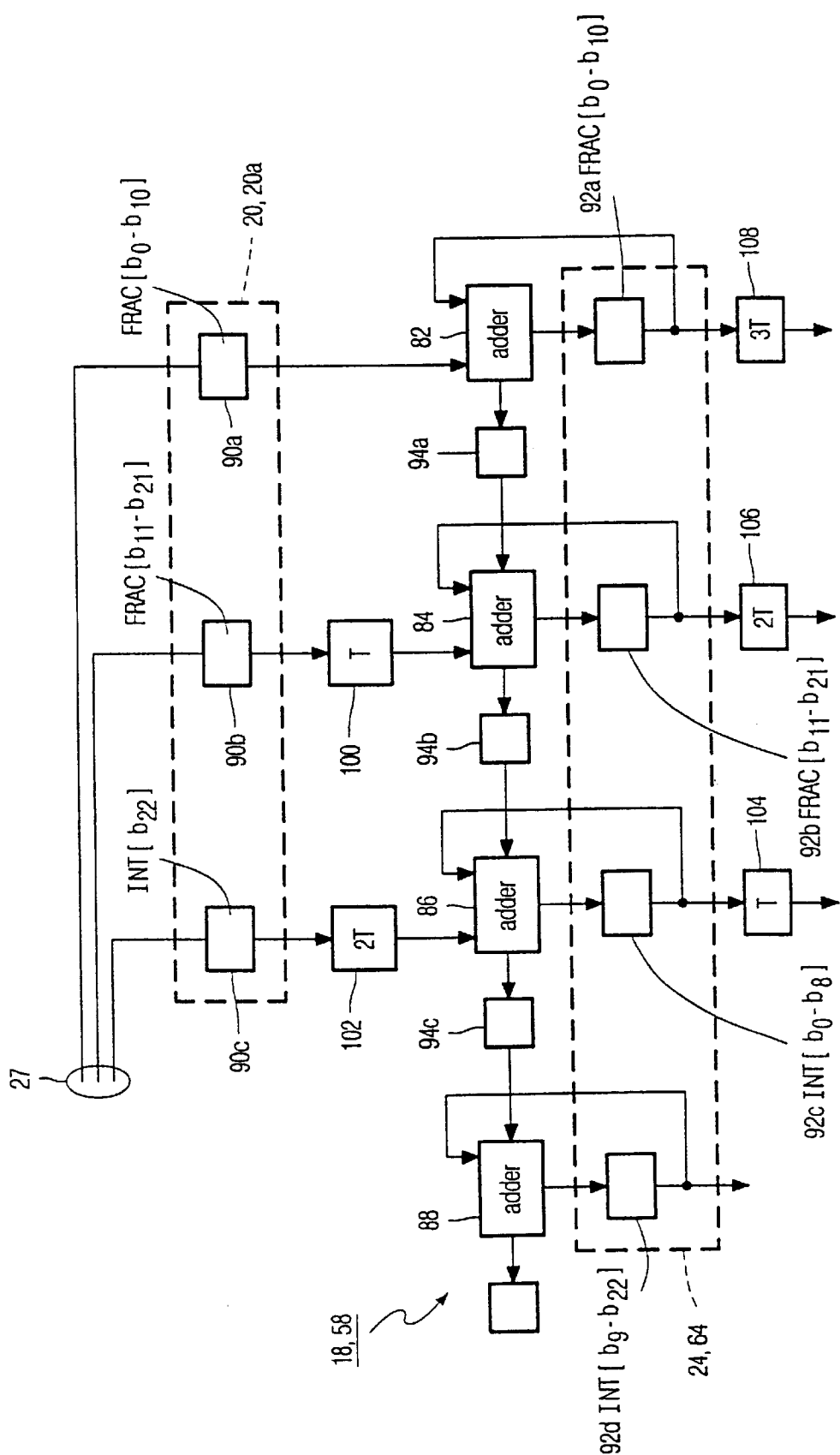
FIG. 3 shows an embodiment of the time stamp value generator unit.

FIG. 3 shows a detailed structure of an embodiment of the time stamp value generation units 16 and 50. The addition to be made in the adder units 18 and 58 contains a ripple path of 22+9+14=45 bits (22 bits in the fraction portion FRAC and 23 bits in the integer portion INT). A 4-stage pipe-lined implementation of the adder unit is shown in FIG. 3. This has the advantage that the delay in the various components can be decreased by roughly a factor of 4, as will be explained later.

FIG. 3 shows four adders 82, 84, 86 and 88 that form the adder unit 18(58). The increment value generator unit 20(20a) has three sub-units 90a, 90b and 90c. The sub-unit 90a generates the 11 least significant bits of the fractional portion of the increment value, denoted FRAC[$b_0, \ldots, b_{10}$]. The sub-unit 90b generates the 10 most significant bits of the fractional portion of the increment value, denoted FRAC [$b_{11}, \ldots, b_{21}$]. The sub-unit 90c generates one bit of the integer portion of the increment value, denoted INT[$b_{22}$]. These sub-units generate, in combination, the increment value INC under the influence of the control signal supplied to them via the line 27. A delay 100, which may be in the form of a FIFO, and realizing a delay of T, which equals one clock period of the 27 MHz oscillator, is provided between the sub-unit 90b and the adder 84. A delay 102, which may also be in the form of a FIFO, and realizing a delay of 2T, is provided between the sub-unit 90c and the adder 86.

The memory unit 24, 64 has four sub-units 92a, 92b, 92c and 92d. The sub-unit 92a has the 11 least significant bits of the fractional portion of the count value $CV_1$ stored in it. The sub-unit 92b has the 10 most significant bits of the fractional portion of the count value $CV_1$ stored in it. The sub-unit 92c has the 9 least significant bits of the integer portion of the count value $CV_1$ stored in it. The sub-unit 92d has the 14 most significant bits of the integer portion of the count value $CV_1$ stored in it. The adder 82 adds the 11 least significant bits of the fractional portion of the increment value to the 11 least significant bits of the fractional portion of the count value $CV_1$. A carry-bit is supplied to the adder 84 via the carry-over control block 94a. The adder 84 adds the 10 most significant bits of the fractional portion of the increment value to the 10 most significant bits of the fractional portion of the count value $CV_1$. A carry-bit is supplied to the adder 86 via the carry-over control block 94b. The adder 86 adds the bit of the integer portion of the increment value to the 9 least significant bits of the integer portion of the count value $CV_1$. A carry-bit is supplied to the adder 88 via the carry-over control block 94c. The adder 88 adds the carry bit to the 14 most significant bits of the integer portion of the count value $CV_1$. Further, a delay 104, which may be in the form of a FIFO, and realizing a delay of T, which equals one clock period of the 27 MHz oscillator, is coupled to the output of the sub-unit 92c. A delay 106, realizing a delay of 2T, is coupled to the output of sub-unit 92b, and a delay 108 realizing a delay of 3T is coupled to the output of the sub-unit 92a.

The 9-bit least significant portion of the integer portion of the count value $CV_1$ runs from 0 to 299, in decimal notation. When the value 299 is reached, a carry over control signal is generated via the block 94c. The 13-bit most significant portion of the integer portion of the count value $CV_1$ runs from 0 to 16383, in decimal notation.

The increment value INC is thus a fractional number that is normally very close to 1.0, in case it is locked to the program clock of the incoming stream. The deviation will then be in the range of +/−100 ppm and depends on the frequency of the incoming program clock and the frequency of the local oscillator frequency. The increment is represented by a 23-bit fixed-point number with one bit left of the decimal point and 22 bits right of the decimal point. Bit $b_{22}$ represents the units, while bit $b_0$ represents the value $2^{(-22)}$, roughly equal to 0.24 ppm. With the use of the increment value INC, the average increment per clock can be controlled in steps of 0.24 ppm. Nominally, the increment is exactly 1.0, and by changing STC_INC, it can be made smaller or larger than 1.0.

The increment value generated by the increment value determining means 20, 20a, is supplied, in this embodiment, to the adder unit 18, 58 in the following way. Upon a first clock pulse of the 27 MHz clock signal, the bits $b_0$ to $b_{10}$ of the fractional portion of the increment value, denoted INC (t=0), are supplied directly to the adder 82, while the bits $b_{11}$ to $b_{21}$ are supplied to the delay 100, and the bit $b_{22}$ is supplied to the delay 102.

Upon the second clock pulse of the 27 MHz clock signal, the following operations are carried out:

(a) an adding operation is carried out in the adder 82 forming the bits $b_0$ to $b_{10}$ of the fractional portion of the next count value, called $CV_2$(t=T), these bits being stored in the memory 92a, and a carry bit being stored in the memory 94a;

(b) further, the bits $b_{11}$ to $b_{21}$ of the increment value INC(0) are supplied to the output of the delay 100, and the bit $b_{22}$ of INC(0) is shifted one position in the delay 102; and (c) further, the bits $b_0$ to $b_{10}$ of the fractional portion of the next increment value, denoted INC(T), are supplied directly to the adder 82, while the bits $b_{11}$ to $b_{21}$ are supplied to the delay 100, and the bit $b_{22}$ is supplied to the delay 102.

Upon the third clock pulse of the 27 MHz clock signal, the following operations are carried out:

(a) an adding operation is carried out in the adder 82 forming the bits $b_0$ to $b_{10}$ of the fractional portion of the next count value, called $CV_2$(2T), these bits being stored in the memory 92a, and a carry bit being stored in the memory 94a;

(b) an adding operation is carried out in the adder 84 forming the bits $b_{11}$ to $b_{21}$ of the fractional portion of the count value $CV_2$(T), these bits being stored in the memory 92b, and a carry bit being stored in the memory 94b;

(c) further, the bits $b_{11}$ to $b_{21}$ of the increment value INC(T) are supplied to the output of the delay 100;

(d) the bits $b_{22}$ of INC(0) and INC(T) are shifted one position in the delay 102, so that the bit $b_{22}$ of INC(0) is now supplied to the adder 86;

(e) the bits $b_0$ to $b_{10}$ of the fractional portion of $CV_2(T)$ are shifted one position in the delay 108; and (f) the bits of the next increment value INC(2T) are supplied to the adder 82, the delay 100 and the delay 102.

Upon the fourth clock pulse of the 27 MHz clock signal, the following operations are carried out:

(a) an addition is carried out in the adder 82 forming the bits $b_0$ to $b_{10}$ of the fractional portion of $CV_2(3T)$, these bits being stored in the memory 92a, and a carry bit being stored in the memory 94a;

(b) an adding operation is carried out in the adder 84 forming the bits $b_{11}$ to $b_{21}$ of the fractional portion of $CV_2(2T)$, these bits being stored in the memory 92b, and a carry bit being stored in the memory 94b;

(c) an adding operation is carried out in the adder 86 forming the bits $b_0$ to $b_8$ of the integer portion of $CV_2(T)$, these bits being stored in the memory 92c, and a carry bit being stored in the memory 94c;

(d) further, the bits $b_{11}$ to $b_{21}$ of the increment value INC(2T) are supplied to the output of the delay 100;

(e) the bits $b_{22}$ of INC(T) and INC(2T) are shifted one position in the delay 102, so that the bit $b_{22}$ of INC(T) is now supplied to the adder 86;

(f) the bits $b_0$ to $b_{10}$ of the fractional portions of $CV_2(T)$ and $CV_2(2T)$ are shifted one position in the delay 108, and the bits $b_{11}$ to $b_{21}$ of the fractional portion of $CV_2(T)$ are shifted one position in the delay 106; and (g) the bits of the next increment value INC(3T) are supplied to the adder 82, the delay 100 and the delay 102.

Upon the fifth clock pulse of the 27 MHz clock signal, the following operations are carried out:

(a) an addition is carried out in the adder 82 forming the bits $b_0$ to $b_{10}$ of the fractional portion of $CV_2(4T)$, these bits being stored in the memory 92a, and a carry bit being stored in the memory 94a;

(b) an adding operation is carried out in the adder 84 forming the bits $b_{11}$ to $b_{21}$ of the fractional portion of $CV_2(3T)$, these bits being stored in the memory 92b, and a carry bit being stored in the memory 94b;

(c) an adding operation is carried out in the adder 86 forming the bits $b_0$ to $b_8$ of the integer portion of $CV_2(2T)$, these bits being stored in the memory 92c, and a carry bit being stored in the memory 94c;

(d) an adding operation is carried out in the adder 88 forming the bits $b_9$ to $b_{22}$ of the integer portion of $CV_2(T)$, these bits being stored in the memory 92d and thus becoming available at the output of this memory 92d;

(e) further, the bits $b_{11}$ to $b_{21}$ of the increment value INC(3T) are supplied to the output of the delay 100;

(f) the bits $b_{22}$ of INC(2T) and INC(3T) are shifted one position in the delay 102, so that the bit $b_{22}$ of INC(2T) is now supplied to the adder 86;

(g) the bits $b_0$ to $b_{10}$ of the fractional portions of $CV_2(T)$, $CV_2(2T)$ and $CV_2(3T)$ are shifted one position in the delay 108, the bits $b_{11}$ to $b_{21}$ of the fractional portions of $CV_2(T)$ and $CV_2(2T)$ are shifted one position in the delay 106, and the bits $b_0$ to $b_8$ of the integer portion of $CV_2(T)$ are shifted one position in the delay 104; and (h) the bits of the next increment value INC(4T) are supplied to the adder 82, the delay 100 and the delay 102.

Now the complete 45-bit word-$CV_2(0)$ is available at the outputs of the delays 108, 106, 104 and the output of the memory 92d.

Upon the next clock pulse, the complete 45-bit word CV(T) is available at these outputs. In this way, the processing delay as a result of the addition has been decreased by roughly a factor of 4, for the reason that the adder unit is divided into four adders with a carry over control and a delayed application of the increments to the adder unit.

While the invention has been described with reference to preferred embodiments thereof, it is to be understood that these are not limitative examples. Thus, various modification will become apparent to those skilled in the art, without departing from the scope of the invention, as defined by the claims. As an example, the time stamp values could have been derived in a different way from the count values than explained above, e.g., by means of a rounding action on the count values. Further, the invention lies in each and every novel feature or combination of features.

What is claimed is:

1. An apparatus for reproducing composite packets from a track on a record carrier, the reproducing apparatus comprising:

read means for reading the composite packets from the record carrier;

time stamp retrieval means for retrieving time stamps from the composite packets;

oscillator means for generating a clock signal having a stable frequency;

reference time stamp generator means for generating reference time stamps, the reference time stamp generator means generating subsequent cycles of subsequent count values in response to the clock signal generated by said oscillator means, the reference time stamp values having a relationship with the count values;

comparator means for respectively comparing the time stamp values retrieved from said packets with the reference time stamp values generated by the reference time stamp generator means, and for generating a control signal in response to said comparison; and presentation means for presenting said packets to an output in response to said control signal, characterized in that the reference time stamp generator means comprises:

increment value generator means for generating a constant increment value, the constant increment value having a relationship with the stable frequency of the clock signal generated by said oscillator means; and adder means for adding the increment value to a former count value in response to the clock signal to form an actual count value.

2. The reproducing apparatus as claimed in claim 1, characterized in that the increment value is equal to 1.

* * * * *